J. R. McWANE.
JOINT FOR CAST IRON PIPE.
APPLICATION FILED JULY 7, 1915.
1,261,254.
Patented Apr. 2, 1918.
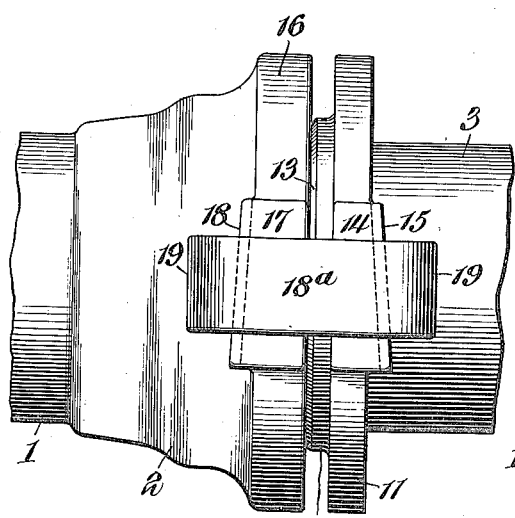
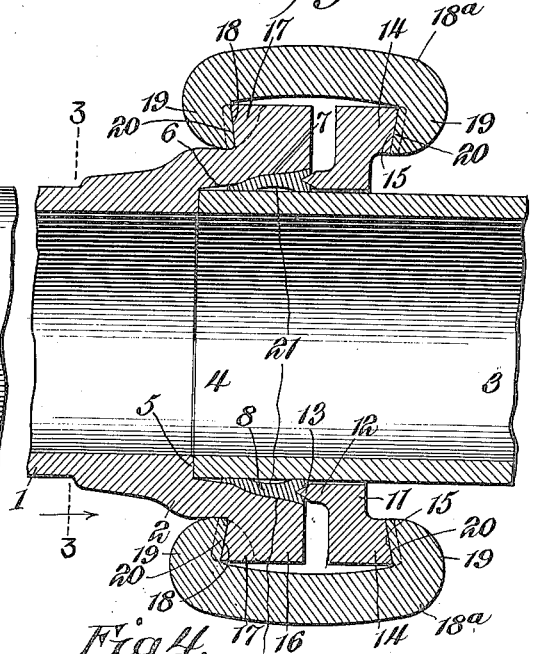
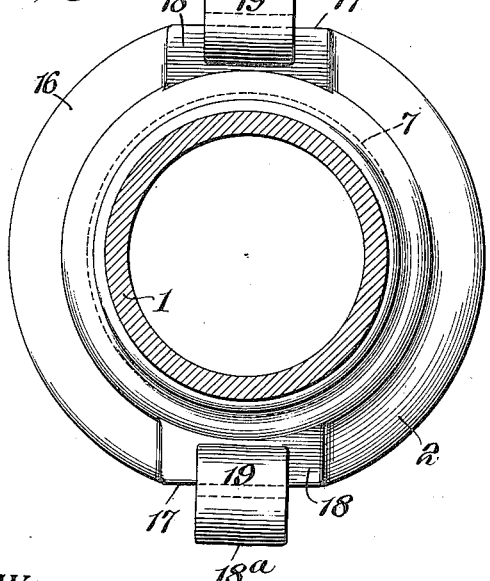
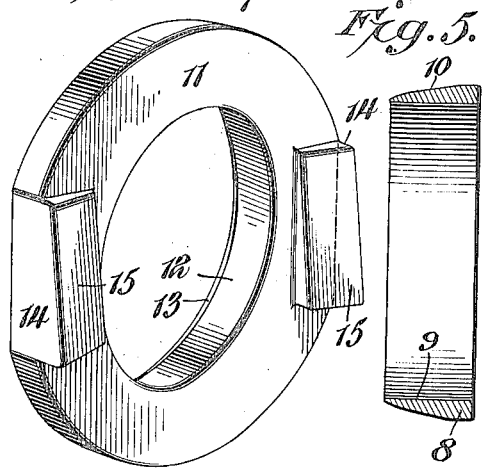
WITNESSES:
Howard D. Orr.
F. T. Chapman.
James R. McWane, INVENTOR,
BY E. G. Siggers
Attorney

UNITED STATES PATENT OFFICE.

JAMES R. McWANE, OF BIRMINGHAM, ALABAMA.

JOINT FOR CAST-IRON PIPE.

1,261,254.  Specification of Letters Patent.  Patented Apr. 2, 1918.

Application filed July 7, 1915. Serial No. 38,483.

*To all whom it may concern:*

Be it known that I, JAMES R. McWANE, a citizen of the United States, residing at Birmingham, in the county of Jefferson and State of Alabama, have invented a new and useful Joint for Cast-Iron Pipe, of which the following is a specification.

This invention has reference to joints for cast iron pipe, and its object is to provide a joint free from certain objections inherent in cast iron pipe joints as ordinarily made.

Cast iron pipe is usually made in suitable lengths with a bell at one end and with the other end, usually called the spigot end, slightly enlarged and of a diameter to fit the bell end of another joint of pipe with a space surrounding the inserted portion of the spigot end, which portion is sealed by means of lead. Ordinarily the joint is first calked with jute and then the sealing is completed with melted lead poured into the remaining space between the outer wall of the spigot end and the inner wall of the bell end receiving it until the space is filled with melted lead, the lead then being driven up with a calking tool.

An ordinary lead joint demands an excess of lead due to the conditions under which the joint is made. There must be plenty of room for "yarning." The pipe and bell are cold. Sometimes moisture is present, thereby necessitating a large volume of metal to make a perfect cast.

With such a joint the lead is not effective for its full depth, while the jute present acts as a cushion and prevents expansion of the lead at the bottom of the joint, so that the only packing effect is near the face of the bell, since the lead expands outwardly and inwardly for but a short distance into the bell.

With the present invention neither bolts nor jute are needed, nor is there any threading of any parts of the pipe. There is no necessity of melting of lead at the trench. Blow-outs are impossible. The amount of labor required is greatly reduced, and the saving in lead is very marked. Moreover, the degree of skill needed for making ordinary lead joints is not required in the production of a better joint by the present invention. The joint of the present invention permits deflection of the line of pipe and allows for expansion and contraction. The joint can be made in water and the sections of pipe may be disconnected at any time without melting the lead.

To this end the invention requires a special construction of bell for the pipe and a packing gland and both the packing gland and the bell end of the pipe are provided with coacting wedge portions adapted to receive clamps or clips, whereby the gland, which is properly shaped for the purpose, firmly seats a lead ring in the space between the inserted spigot end of the pipe and the bell end of the pipe receiving the spigot end. In assembling the parts the lead ring, which is an exteriorly tapered ring, is driven into the space designed to receive it, this resulting in an unusually efficient sealing of the pipe, and the ring is anchored in place by the glands and clamps or clips.

The parts are readily assembled in the trench and wholly avoid the handling of any melted lead. Moreover should it become necessary at any time to disconnect the pipe this is done as readily as the assembling of pipe, and without the necessity of melting the lead.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—

Figure 1 is a side elevation of the joint showing the contiguous ends of two side sections connected together.

Fig. 2 is a longitudinal section in the plane of the clamps or clips.

Fig. 3 is a section on the line 3—3 of Fig. 2.

Fig. 4 is a perspective view of the gland.

Fig. 5 is a diametric section of a lead ring.

Referring to the drawings there is shown a pipe section 1 having a bell end 2 and another pipe section 3 having a spigot end 4. The bell end 2 is properly shaped to receive the spigot end 4 until the latter abuts against a shoulder 5 formed in the bell end, which latter where receiving the spigot end of the pipe section 3 tapers toward the shoulder, thereby providing a tapering annular chamber 6 considerably wider at the outer end of the bell than toward the shoulder 5.

The inner wall of the bell end of the pipe may curve to a slight extent longitudinally, and this curve is shown in the drawings at 7 as approaching the outer wall of the spigot end 4.

Adapted to the chamber 6 is a lead ring 8 which before introduction into the chamber 6 may be substantially or quite cylindrical on its inner surface 9, while its outer surface 10 tapers from a width approximating that of the thickness of the chamber 6 between the spigot end 4 and the inner wall of the bell end 5 to a relatively thin edge at the other end of the ring.

There is also provided an annular gland 11 of a size to move freely yet snugly along the spigot end of the pipe 3, and this gland has on one end adjacent to its inner wall an annular rib 12 terminating in a reversely beveled edge 13 constituting an annular wedge.

At diametrically opposite points the ring 11 has formed thereon two bosses 14 extending generally tangential to the ring-shaped gland and having the surface remote from the flange 12 tapering toward one side of the ring and also toward the center of the ring, so that the taper is a compound taper. Both bosses have the tapered surface indicated at 15 tapering toward the same side of the ring.

The bell end 2 of the pipe 1 is provided, as is customary, with a terminal radial flange 16, and at diametrically opposite points this flange is provided with bosses 17 similar to the bosses 14 and each boss has a face 18 tapering in conformity with the tapered face 15 of the companion boss 14 on the ring-shaped gland 11.

Furthermore, there are provided clips 18ᵃ each of a length to embrace the companion bosses 14 and 17 of the assembled joint, and these clips have inturned ends 19 each with an inner face 20 tapering in conformity with the taper of the boss 14 and companion boss 17, that is, the taper of the face 20 is a compound taper so that these faces are closer together at their outer extremities as measured away from the body of the clip than where adjacent to the body of the clip.

In assembling the joint, the spigot end 4 is placed into the bell end 2 until it seats against the shoulder 5 and then the lead ring 8 previously introduced upon the spigot end 4 is moved into the chamber 6 and then by means of a calking tool is driven firmly into the chamber 6. The thin end of the ring is directed by the curved wall 7 toward the outer wall of the spigot end 4 until in firm contact therewith, while the thick end of the ring is expanded by the action of the calking tool until the large end of the chamber 6 is completely filled, while the intermediate portion of the ring buckles more or less, as shown at 21, whereby the ring is made to engage the spigot end of the introduced pipe 3 in a line about the latter deep into the chamber 6 and also along a line about the spigot end at the entrance to the bell end of the pipe 1.

Now the gland 11 also previously placed upon the spigot end 4 is moved into engagement with the exposed edge of the lead ring with the bosses or wedge blocks 14 coinciding with the bosses or wedge blocks 17. Ordinarily the pipe is laid in the trench so that the narrow ends of these blocks are uppermost and the clips or clamp parts 18 are placed upon the thin ends of these wedge blocks to be driven toward the thick ends thereof, this being a relatively easy matter because the direction of movement of the clamps or clips is then downward.

As the clips are driven along the matching blocks 14 and 17 the tapering form of these blocks causes the movement of the gland 11 toward the bell end of the pipe 1, thus forcing the wedge-like edge 13 of the rib 12 into the exposed end of the lead ring, thus expanding it more firmly into engagement with the inner wall of the bell 2 and the outer wall of the spigot 4 and, moreover, binding the two ends of the pipe firmly together. This produces so close a contact of the lead ring over such a wide area of the telescoped ends of the pipes as to provide a most effective joint completely proof against leakage of either gas or water. This is accomplished without any packing material whatever except lead, without the use of any screws or bolts or threading of parts, and in a manner which permits the separation of the pipe as needed with the greatest facility and without the necessity of melting any lead.

The lead ring is most effectively locked in place and blow-outs are wholly avoided.

The amount of labor required to complete the joint is only about fifty per cent. of that required to prepare an ordinary lead joint. Moreover, the production of lead joints is a matter requiring skilled labor, while the joint of the present invention does not demand such skill in its formation. The joint is very positive in action and there is almost no liability of leakage even though there be deflections in the line.

The joint is effective at the bottom of the bell as well as at the mouth of the bell, and since there are two different points of contact of the lead ring with the bell and spigot in the direction of the length of the pipe, the effectiveness of the joint is doubled and the liability of leakage reduced to a negligible minimum.

After the lead ring is calked into place the lead is then practically level with the outer end of the bell and as the gland is forced into the lead by the clamps or clips, which together with the wedge-shaped bosses engage on about a six degree taper, the sharp edge 13 is readily embedded in the lead and the parts retain their positions indefinitely against all ordinary disturbing forces.

The gland and clamps are plain castings easily constructed and requiring no machining, wherefore the cost of production is relatively small. Being of cast iron they are, like the pipe, practically everlasting.

The use of the lead ring and the clamping gland permits the employment of a smaller bell and the omission of the annular bead or flange on the spigot end of the pipe. The result is that the weight of the pipe, gland ring and clips is not materially greater than the ordinary style of cast iron pipe.

What is claimed is:—

1. A cast iron pipe joint comprising a bell end and a spigot end with the bell end having bosses on opposite sides both tapered toward one side of the pipe and also toward the middle of the pipe, a gland ring provided with oppositely located bosses both with faces tapered toward one side of the ring and toward the middle of the ring, the bosses of the bell end of the pipe and of the gland corresponding and said gland being provided on the face remote from the bosses with an inner axially extended rib having the edge remote from the gland of wedge shape, and a lead ring adapted to the space in the bell end of the pipe surrounding the spigot end of the pipe inserted into the bell to be expanded into contact with the inner wall of the bell and the outer wall of the spigot and to be engaged by the wedge edge of the rib on the gland, the joint also including connecting clips or clamps with taper faces adapted to the taper faces of the matching bosses of the bell and gland ring.

2. A cast iron pipe joint comprising a bell end and a spigot end with the bell end having bosses on opposite sides both tapered toward one side of the pipe and toward the middle of the pipe, a gland ring provided with oppositely located bosses both with faces tapered toward one side of the ring and toward the middle of the ring, the bosses on the bell end of the pipe and on the gland corresponding and said gland being provided on the face remote from the bosses with an inner axially extended rib having the edge remote from the body of the gland of wedge shape, and a lead ring adapted to the space in the bell end of the pipe surrounding the spigot end of the pipe inserted into the bell to be expanded into contact with the inner wall of the bell and the outer wall of the spigot and to be engaged by the wedge edge of the rib on the gland, the joint also including connecting clips or clamps with taper faces adapted to the taper faces on the matching bosses on the bell and gland ring, and the inner wall of the bell tapering toward the inner end of the bell and rounded to direct the corresponding end of the lead ring against the outer wall of the spigot end of the inserted pipe.

3. A joint for cast iron pipe comprising a bell portion and a spigot portion adapted to enter the bell portion, a preformed lead ring adapted to enter the bell end about the spigot portion, a gland ring in surrounding relation to the spigot end and having a portion for engaging the lead ring seated in the bell end, both the bell and gland ring having exterior matching wedge portions, and wedge engaging clips conforming to the tapers of the wedges for causing the approach of the gland toward the bell end on the movement of the wedge clips toward the thicker end of the wedge members on the bell and gland.

4. A joint for cast iron pipe comprising a bell portion with a tapering interior, a spigot portion adapted thereto and defining an annular chamber within the bell about said spigot portion with said chamber tapering from the outer end of the bell toward the inner end thereof, a preformed tapering lead ring adapted to the annular tapering chamber in the bell, a gland having a portion for engaging the larger end of the lead ring when seated in the bell, and wedge-shaped clamp means adapted to engage the bell and gland, said clamp means and the portions of the bell and gland engaged thereby being coactively shaped for movement of the clamp means on to the bell and gland from the same side of the joint in a direction tangential to the circumference of said bell and gland.

5. A joint for cast iron pipe, comprising a bell end and a spigot end, a preformed lead ring of a size and shape to enter the bell end about the spigot end inserted therein, a gland of a size to encircle the spigot end and having an integral portion to engage the lead ring and enter and spread the portion of the latter exposed at the mouth of the bell end, and clamps engaging the gland and the bell end of the joint and movable circumferentially thereof for imparting longitudinal movement to the gland in a direction to enter the seated lead ring.

6. A joint for cast iron pipe, comprising bell and spigot members, a preformed lead ring for introduction into the bell around the inserted spigot, a gland ring with an integral annular rib terminating in a wedge edge for engaging the lead ring when seated in the bell, and coacting clamps engaging the gland ring and the bell member and movable circumferentially of the pipe to seat the wedge edge of the gland ring in and spread that edge of the lead ring exposed at the mouth of the bell.

7. A joint for cast iron pipe comprising bell and spigot members, a preformed tapering lead ring for introduction into the bell around the inserted spigot, and a gland applied to the lead ring, the gland and bell being provided with coacting clamping means, said clamping means being located on opposite sides of the joint and provided with clamp members movable into clamping position on the bell and gland both from the same side of the pipe.

In testimony, that I claim the foregoing as my own, I have hereto affixed my signature in the presence of two witnesses.

JAMES R. McWANE.

Witnesses:
HARRY J. EARLY,
C. W. HENRY.